May 18, 1926.

J. D. BOWERS 1,584,836

SPRING SUPPORT

Original Filed April 7, 1923

WITNESSES

Inventor
JOSEPH D. BOWERS

Patented May 18, 1926.

1,584,836

UNITED STATES PATENT OFFICE.

JOSEPH D. BOWERS, OF BLUEFIELD, WEST VIRGINIA.

SPRING SUPPORT.

Application filed April 7, 1923, Serial No. 630,574. Renewed November 4, 1925.

The present invention relates to a spring support for a vehicle and has for its principal object to provide a combined spring and shock absorber.

Another object of the invention is to provide a shock absorber which may be adjusted so as to accommodate the load carried by the vehicle.

Another important object of the invention is to provide a device of this nature which will be simple and efficient in construction, reliable in operation, comparatively inexpensive to manufacture, durable, and well adapted to the purpose for which it is designed.

With the above and numerous other objects in view as will appear as the description progresses, the invention resides in certain novel features of construction, and the combination and arrangement of parts as will be hereinafter more fully described and claimed.

Figure 1:
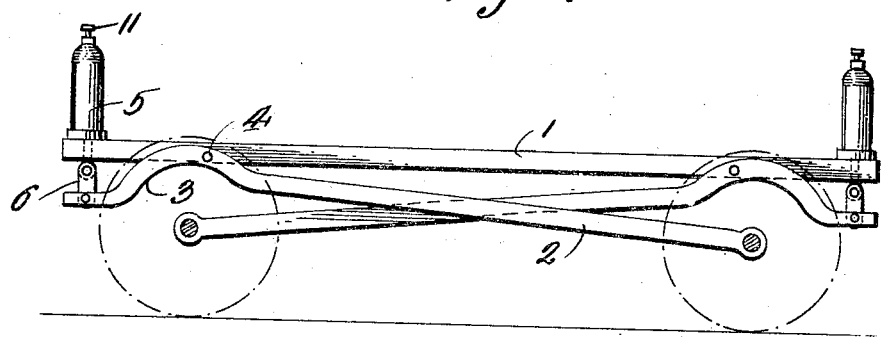
Figure 2:
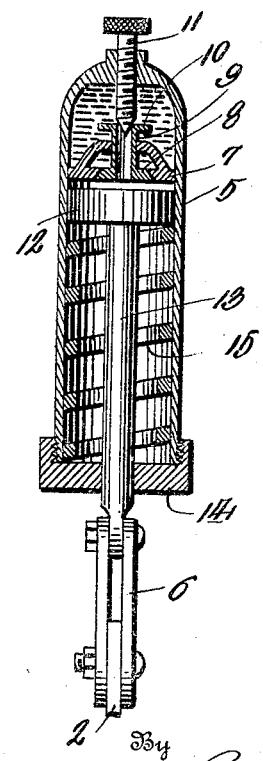

In the accompanying drawings forming a part of this specification and in which like numerals are employed to designate corresponding parts throughout the same:

Figure 1 is a side elevation of a vehicle chassis showing my device mounted in association therewith, and Figure 2 is an enlarged vertical sectional view taken through the device embodying my invention.

Referring to the drawing in detail it will be seen that 1 designates chassis of a vehicle which may be of any preferred construction. The levers 2 are fulcrumed to this chassis adjacent one end. It is to be noted that these levers are formed with the curved portions 3 and are fulcrumed at 4 intermediate their curved portions. The lever 2 which is fulcrumed to the rear of the vehicle will support the axle at the front of the vehicle and vice versa as is evident from an inspection of Figure 1. There are an equal number of cylindrical casings 5 with the levers 2. Each lever is associated with one of the cylindrical casings 5 having its end closer to its fulcrum pivotally attached to a link 6. A partition 7 having a valve seat centrally disposed therein is positioned in each cylindrical casing 5 adjacent the upper end thereof and forms a compartment for glycerine or oil or any other suitable liquid. A valve 8 is associated with the valve seat of the partition 7 and is preferably formed integral with a tubular valve stem 9 terminating at its upper end in a flange of annular construction 10. A needle valve 11 of the screw type is threadedly mounted in the top of the cylindrical casing 5 for engagement with the upper opening of the tubular valve stem 9 so that the valve 8 may be closed completely or only partially closed as may be desired. A piston 12 is adapted to reciprocate in the other portion of the cylinder 5 and is fixed to a piston rod 13 movable through the cap 14 threadedly mounted on the lower end of the cylinder. The lower end of this piston rod 13 is pivotally attached to the link 6.

A compressible coil spring 15 is disposed in the cylinder 5 between the piston 12 and the cap 14 thus normally holding the piston in a raised position as illustrated in Figure 2. As weight is placed upon the vehicle this spring 15 will be compressed as is evident. When the spring 15 is compressed by the piston 12 moving from the partition 7 the valve 8 will drop to an open position allowing the liquid in the upper compartment to flow on top of the piston 12. When the spring 15 expands and tends to compress the liquid it will be forced slowly back into the upper compartment and the piston 12 is thus caused to move to its original position slowly without any undesirable shocks. The flow of the liquid back into the upper compartment may be regulated at the end of the upward stroke of the piston 12 depending upon the adjustment made by the needle valve 11.

Although I have described my invention with a certain degree of particularity it is to be understood that numerous changes in the details of construction and in the combination and arrangement of parts may be resorted to without departing from the spirit of the invention as hereinafter claimed.

Having thus described my invention what I claim as new is:—

1. A device of the class described including a closed cylinder adapted to receive a quantity of liquid, a partition disposed intermediately in the cylinder and provided with an opening forming a valve seat, a valve associated with the valve seat, a tubular valve stem mounted on the valve and slidable through the opening in the partition, and a needle valve adjustably mounted in one end of the cylinder for association with the tubular valve stem, and a spring pressed piston disposed below the partition, said spring normally holding said piston adjacent the partition and said valve opening toward the piston.

2. A device of the class described including a closed cylinder adapted to receive a quantity of liquid, a partition disposed intermediately in the cylinder and provided with an opening extending therethrough forming a valve seat, a piston movably mounted in the cylinder, a spring tending to hold the piston adjacent the partition, a valve associated with the valve seat and adapted to open by moving toward the piston, a hollow valve stem mounted on the valve and extending through the opening of the partition and provided with a stop flange on its end, a needle valve threaded through one end of the cylinder and adapted to engage the hollow valve stem for closing the same when the valve is closed on its seat.

3. A device of the class described including a cylinder having one end constructed to form an opening having threads, a needle valve threaded in said opening and extending into the cylinder, a partition disposed intermediately in the cylinder and provided with an opening forming a valve seat, a piston movable in the cylinder on the opposite side of the partition from the needle valve, a valve associated with the valve seat movable toward the piston and disposed out of engagement with the valve seat, a hollow valve stem extending through the opening in the partition and attached to the valve and having a stop flange formed on its end adjacent the needle valve, a spring in the cylinder normally holding the piston toward the partition so that when the valve is brought to a closed position on the partition the end of the tube engaging the needle valve for closing the tube all in the manner and for the purpose specified.

In testimony whereof I affix my signature.

JOE D. BOWERS.